(12) United States Patent
Burckart et al.

(10) Patent No.: US 8,799,477 B2
(45) Date of Patent: Aug. 5, 2014

(54) HYPERVISOR SELECTION FOR HOSTING A VIRTUAL MACHINE IMAGE

(71) Applicant: International Business Machines Corporation, Armonk, NY (US)

(72) Inventors: Erik J. Burckart, Research Triangle Park, NC (US); Andrew J. Ivory, Durham, NC (US); Todd E. Kaplinger, Research Triangle Park, NC (US); Stephen Kenna, Durham, NC (US); Aaron K. Shook, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/056,931

(22) Filed: Oct. 17, 2013

(65) Prior Publication Data

US 2014/0047442 A1 Feb. 13, 2014

Related U.S. Application Data

(62) Division of application No. 12/828,255, filed on Jun. 30, 2010, now Pat. No. 8,601,129.

(51) Int. Cl.
*G06F 15/173* (2006.01)

(52) U.S. Cl.
USPC .......................................................... 709/226

(58) Field of Classification Search
USPC ...................... 709/201–203, 216–228; 718/1; 717/168–178
See application file for complete search history.

(56) References Cited

U.S. PATENT DOCUMENTS

| | | | |
|---|---|---|---|
| 7,356,679 B1 * | 4/2008 | Le et al. ............................ 713/1 |
| 8,176,486 B2 * | 5/2012 | Amir Husain .................... 718/1 |
| 8,219,653 B1 * | 7/2012 | Keagy et al. .................. 709/222 |
| 8,533,305 B1 * | 9/2013 | Keagy et al. .................. 709/222 |
| 2008/0201479 A1 * | 8/2008 | Husain et al. ................. 709/227 |
| 2008/0244579 A1 * | 10/2008 | Muller ......................... 718/100 |
| 2009/0100420 A1 * | 4/2009 | Sapuntzakis et al. ......... 717/171 |
| 2009/0210873 A1 * | 8/2009 | Cuomo et al. ................... 718/1 |
| 2010/0017801 A1 * | 1/2010 | Kundapur ........................ 718/1 |
| 2010/0058328 A1 * | 3/2010 | DeHaan ........................ 717/176 |
| 2010/0262650 A1 * | 10/2010 | Chauhan et al. .............. 709/203 |
| 2010/0324257 A1 * | 12/2010 | Karau et al. ................... 528/310 |
| 2010/0332617 A1 * | 12/2010 | Goodwin et al. ............. 709/219 |
| 2011/0125894 A1 * | 5/2011 | Anderson et al. ............. 709/224 |
| 2011/0126197 A1 * | 5/2011 | Larsen et al. ..................... 718/1 |
| 2011/0126198 A1 * | 5/2011 | Vilke et al. ........................ 718/1 |

* cited by examiner

*Primary Examiner* — Sargon Nano
(74) *Attorney, Agent, or Firm* — Steven M. Greenberg, Esq.; CRGO Law

(57) ABSTRACT

Embodiments of the present invention provide a method, system and computer program product for selecting a hypervisor for hosting a virtual machine (VM) image. In an embodiment of the invention, a method of selecting a hypervisor for hosting a VM image can include selecting an application for inclusion in a VM image, determining characteristics of the application and creating a VM image with the selected application. The method also can include identifying a hypervisor hosting a different VM image with an application having in common at least a portion of the determined characteristics. Finally, the method can include deploying the created VM image to the identified hypervisor. Of note, the deployment of the created VM image can be to an identified hypervisor in a node of a cloud computing cluster.

3 Claims, 1 Drawing Sheet

HYPERVISOR SELECTION FOR HOSTING A VIRTUAL MACHINE IMAGE

CROSS-REFERENCE TO RELATED APPLICATIONS

This application is a Divisional of U.S. application Ser. No. 12/828,255, filed Jun. 30, 2010, currently pending, the entirety of which is incorporated herein by reference.

BACKGROUND OF THE INVENTION

1. Field of the Invention

The present invention relates to the field of virtualization and more particularly to hypervisor management in a virtualized computing environment.

2. Description of the Related Art

For many decades, computing implied both an application and a supporting platform. Until the late twentieth century, a host computing environment included a hardware infrastructure of processor core, input/output, memory and fixed storage, the combination of which supported an operating system, which in turn supported the execution of a single application at a time. Gradually, as processor power increased exponentially, advanced forms of the operating system enabled both simulated and actual multi-tasking such that multiple applications could execute within the same host computing environment.

Initially, applications were self contained bundles of logic relying on little other than core object files and related resource files. As computing become integral to modern industry, however, applications became co-dependent on the presence of other applications such that the requisite environment for an application included not only the underlying operating system and supporting hardware platform, but also other key applications including application servers, database management servers, collaboration servers and communicative logic commonly referred to as middleware. Given the complexity of application and platform interoperability, however, different combinations of applications executing in a single hardware platform can demonstrate differing degrees of performance and stability.

Virtualization as a technology aims to interject a layer between the hardware platform and operating system and executing applications. From the perspective of business continuity and disaster recovery, virtualization provides the inherent advantage of environment portability. Specifically, to move an entire environment configured with multiple different applications is a matter of moving a virtual machine (VM) image from one supporting hardware platform to another. Further, more powerful computing environments can support the coexistence of multiple different VM images, all the while maintaining a virtual separation between the VM images. Consequently, a failure condition in one VM image cannot jeopardize the integrity of other co-executing VM images in the same hardware platform.

A VM monitor, known in the art as a "hypervisor", manages the interaction between each VM image and the underlying resources provided by the hardware platform. In this regard, a bare metal hypervisor runs directly on the hardware platform much as an operating system runs directly on hardware. By comparison, a hosted hypervisor runs within a host operating system. In either case, the hypervisor can support the operation of different VM images—the number of VM images being limited only by the processing resources of a VM container holding the VM images or the hardware platform itself.

Of note, virtualization has been extended to the cloud computing environment. Cloud computing refers to Internet-based computing, whereby shared resources, software, and information are provided to computers and other devices on demand. Cloud computing typically involves over the-Internet-provision of dynamically scalable and often virtualized resources and is a byproduct and consequence of the ease-of-access to remote computing sites provided by the Internet. It will be recognized then, that optimal placement of a VM image for an application in the cloud will be integral to the success of cloud deployment virtualization. Conventionally, cloud brokers perform such placement and base the placement on factors such as available resources, computing power, storage, network bandwidth and power consumption.

BRIEF SUMMARY OF THE INVENTION

Embodiments of the present invention address deficiencies of the art in respect to VM image placement and provide a novel and non-obvious method, system and computer program product for selecting a hypervisor for hosting a VM image. In an embodiment of the invention, a method of selecting a hypervisor for hosting a VM image can include selecting an application for inclusion in a VM image, determining characteristics of the application and creating a VM image with the selected application. The method also can include identifying a hypervisor hosting a different VM image with an application having in common at least a portion of the determined characteristics. Finally, the method can include deploying the created VM image to the identified hypervisor. Of note, the deployment of the created VM image can be to an identified hypervisor in a node of a cloud computing cluster.

In one aspect of the embodiment, selecting an application for inclusion in a VM image includes selecting an archive of an application for inclusion in a VM image. As such, determining characteristics of the application includes introspecting the archive of the application to retrieve meta-data indicating at least one of a manifest of applications in the archive, a set of artifacts to be generated by script within the applications, and a container version used to create the applications. In another aspect of the embodiment, identifying a hypervisor hosting a different VM image with an application having in common at least a portion of the determined characteristics includes creating a profile from the characteristics of the application, and identifying a hypervisor hosting a different VM image with a profile mapped to the created profile.

In another embodiment of the invention, a distributed computing data processing system can be configured for hypervisor selection for hosting a VM image. The system can include a host server with at least one processor and memory and coupled to different hypervisors in nodes of a distributed computing data processing system, for example a cloud computing cluster. The system also can include a repository of applications coupled to the host server and a broker coupled to the host server and configured to create and place different VM images into selected ones of the hypervisors. Finally, the system can include a hypervisor selection module executing in the memory of the host server. The module can include program code enabled to determine characteristics of a selected application in the repository of applications, to identify a hypervisor amongst the hypervisors already hosting a VM image with an application having in common at least a portion of the determined characteristics, and to direct the broker to create and deploy a VM image with the selected application to the identified hypervisor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for hypervisor selection for hosting a VM image in a distributed computing environment. In accordance with an embodiment of the invention an application can be selected for inclusion in a VM image to be deployed to a hypervisor in a node of a distributed computing system such as a cloud computing cluster. Different attributes of the application can be determined through introspection of the application. Thereafter, a VM image can be created with the selected application. Importantly, a hypervisor can be identified in a node of the distributed computing system hosting a different VM image with an application having in common at least a portion of the determined attributes. Thereafter, the created VM image can be deployed to the identified hypervisor in the node of the distributed computing system. Optionally, over time the hypervisors of the distributed computing system can reassigned different VM images to aggregate VM images having in common selected attributes.

Figure 1:
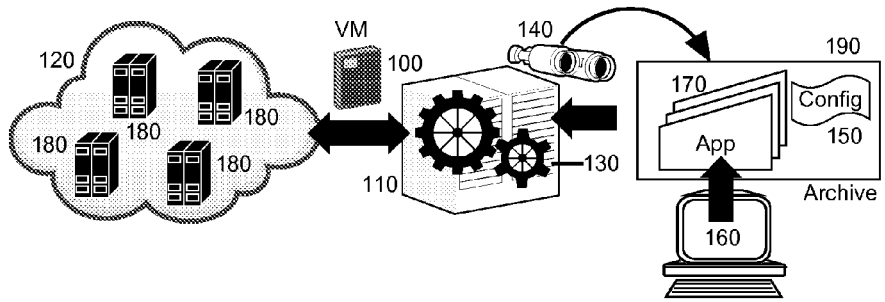
FIG. 1 is pictorial illustration of a process for hypervisor selection for hosting a VM image in a distributed computing environment.

In further illustration, FIG. 1 pictorially depicts a process for hypervisor selection for hosting a VM image in a distributed computing environment. As shown in FIG. 1, an application 170 can be created and packaged into an archive 190. Different annotations 150 can be provided in the archive 190 to indicate not only a manifest of the components of the application 170, but also to indicate a container version of a container 160 used to create the application 170. The archive 190 can be provided to broker 110 configured to deploy the application 170 to a hypervisor 180 in a node of a distributed computing system 120, for example a cloud computing cluster. To that end, hypervisor selection logic 130 using introspection 140 can analyze the annotations 150 of the archive 190 to identify the different application components of the application 170 and also the container version of the container 160. Thereafter, the hypervisor selection logic 130 can select one of the hypervisors 180 in the distributed computing system 120 already hosting a similar profile of applications and supporting the container version of the container 160. Finally, a VM image 100 of the archive 190 can be deployed to the selected one of the hypervisors 180

Figure 2:
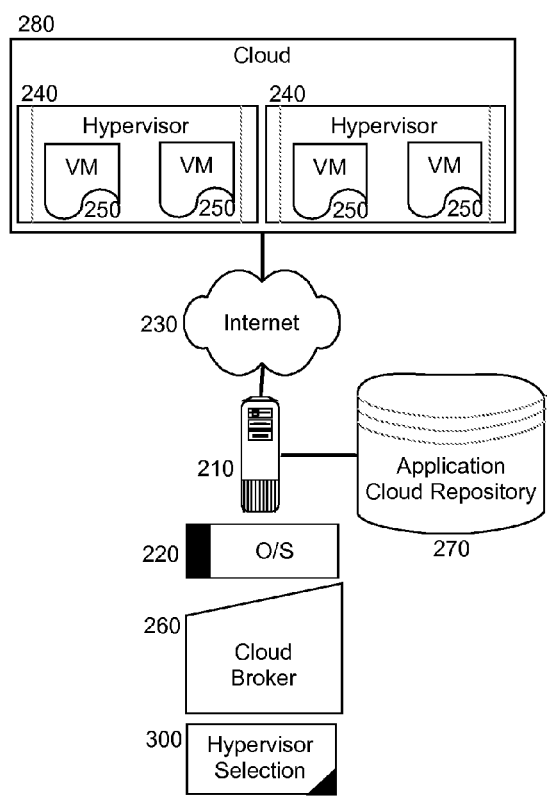
FIG. 2 is a schematic illustration of a distributed computing data processing system configured for hypervisor selection for hosting a VM image; and, FIG. 3 is a flow chart illustrating a process for hypervisor selection for hosting a VM image in a distributed computing environment.

The process described in connection with FIG. 1 can be implemented in a distributed computing data processing system such as a cloud brokering system. In further illustration, FIG. 2 schematically shows a distributed computing data processing system configured for hypervisor selection for hosting a VM image. The system can include a host server 210 with at least one processor and memory communicatively coupled over computer communications network 230 to different hypervisors 240 hosting different VM images 250 in a distributed computing system such as a cloud computing cluster 280. The host server 210 can host the operation of operating system 220 supporting the execution of a cloud broker 260.

The cloud broker 260 can be configured to create a VM image 250 from an application archive disposed in application cloud repository 270 and to deploy the created VM image 250 to a selected one of the hypervisors 240. Of import, hypervisor selection module 300 can be coupled to the cloud broker 260. The hypervisor selection module 300 can include program code that when executed in the memory of the host server 210 can introspect an application archive selected for deployment in a VM image to a hypervisor in the cloud computing cluster 280 in order to determine characteristics of the underlying application such as required dependencies, a container version used to compile the application components of the application, and the like.

The program code of the hypervisor selection module 300 further can be enabled to match the characteristics of the underlying application to characteristics of an application already deployed in a VM image 150 in a particular hypervisor 240. As such, the particular hypervisor 240 can be selected by the hypervisor solution module 300 to receive deployment of the VM image 250 of the application archive by the cloud broker 260. In this way, efficiencies of deployment can be gained by deploying like applications in VM images 250 to the same hypervisor 240 in the cloud computing cluster 280. Examples include similar dependencies requisite to the operation of both applications based upon a common or similar container version used to generate both applications. On note, in an optional embodiment, VM image 150 once placed in a particular hypervisor 240 can be removed to a different hypervisor 240 as can other VM images 150 in order to rebalance the load of the hypervisors 240 to host like VM images 140.

Figure 3:
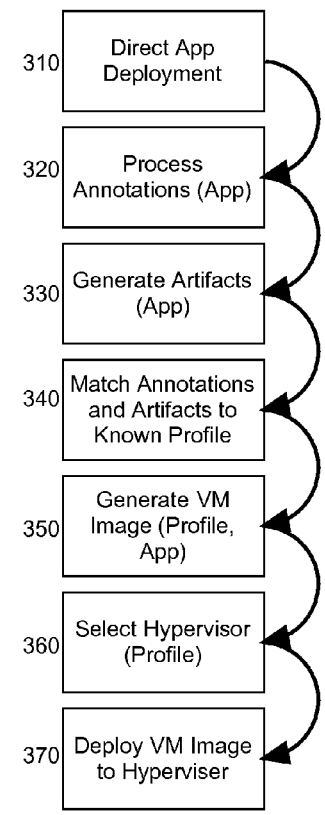

In even yet further illustration of the operation of the hypervisor selection module 300, FIG. 3 is a flow chart illustrating a process for hypervisor selection for hosting a VM image in a distributed computing environment. Beginning in block 310, an application archive can be selected for deployment to a hypervisor in a cloud computing cluster. In block 320, annotations in the archive can be processed to determine characteristics of the application. In block 330, one or more artifacts can be generated such as script logic disposed within source code of the application. Thereafter, in block 340 the characteristics and artifacts can be matched to a known profile. In block 350, a VM image can be generated for the application archive and can include the profile. Subsequently, in block 360 a hypervisor in the cloud computing cluster already hosting a VM image of similar profile can be selected and in block 370, the generated VM image can be deployed to the selected hypervisor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A distributed computing data processing system configured for hypervisor selection for hosting a virtual machine (VM) image, the system comprising:
 a host server with at least one processor and memory and coupled to a plurality of hypervisors in nodes of a distributed computing data processing system;
 a repository of applications coupled to the host server;
 a broker coupled to the host server and configured to create and place different VM images into selected ones of the hypervisors; and,
 a hypervisor selection module executing in the memory of the host server, the module comprising program code enabled to determine characteristics of a selected application in the repository of applications, to identify a hypervisor amongst the hypervisors already hosting a VM image with an application having in common at least a portion of the determined characteristics, and to direct the broker to create and deploy a VM image with the selected application to the identified hypervisor.

2. The system of claim 1, wherein the characteristics are disposed in meta-data of an archive including the selected application indicating at least one of a manifest of applications in the archive, a set of artifacts to be generated by script within the applications in the archive, and a container version used to create the applications in the archive.

3. The system of claim 1, wherein the distributed computing data processing system is a cloud computing cluster and wherein the broker is a cloud broker.

* * * * *